UNITED STATES PATENT OFFICE.

JEROME T. GRAY, OF NORTH SPRINGFIELD, MISSOURI.

PROCESS OF PRESERVING EGGS.

SPECIFICATION forming part of Letters Patent No. 358,656, dated March 1, 1887.

Application filed March 18, 1886. Serial No. 195,730. (No specimens.)

*To all whom it may concern:*

Be it known that I, JEROME T. GRAY, a citizen of the United States, residing at North Springfield, in the county of Greene and State of Missouri, have invented certain new and useful Improvements in Processes of Preserving Eggs; and I do hereby declare the following to be a full, clear, and exact description of the invention, such as will enable others skilled in the art to which it appertains to make and use the same.

My invention relates to processes of preserving eggs, the object of which is to keep the quality of the eggs in a perfect condition, so that they will taste as well and be as useful for all purposes when a year or more old as when fresh.

To carry my invention into effect, I take the eggs when fresh and dip them first into boiling water, where they are to remain about five seconds of time, preferably not longer. This process contracts the pores in the shell without injuring the interior of the egg. The eggs are then dipped into a hot solution of grease and soda, preferably tallow is used, in the proportion of ten pounds of tallow to two pounds of soda, which is heated to the boiling-point of water. The eggs are allowed to remain in this second bath just long enough to have the liquid come in contact with all parts of the shell. The eggs are then removed from the bath and allowed to cool. The soda used in the bath thins the tallow, so that it forms a thin smooth coating all over the egg, and thus seals all of the pores in the shell that were not closed by the first bath, and thus makes the entire shell impervious to air. When in this condition, the eggs will remain in a perfect state of preservation without losing any of their fresh flavor or quality, and preserve a clean smooth surface in the market.

I am aware that it is not new to prepare eggs for preserving by dipping the eggs in boiling water or in melted grease Therefore,

Having thus described my invention, what I claim as new, and desire to secure by Letters Patent, is—

The process of preserving eggs, which consists in dipping them in boiling water, and then in a boiling mixture of grease and soda, substantially as described.

In testimony whereof I affix my signature in presence of two witnesses.

JEROME T. GRAY.

Witnesses:
S. C. HASELTINE,
S. A. HASELTINE.